United States Patent [19]

Conn

[11] Patent Number: 4,688,028
[45] Date of Patent: Aug. 18, 1987

[54] AUDIBLE LOW-FUEL ALARM FOR PROPANE FUEL TANK

[76] Inventor: Sidney H. Conn, 139 N. Mulberry St., Statesville, N.C. 28677

[21] Appl. No.: 804,526

[22] Filed: Dec. 4, 1985

[51] Int. Cl.⁴ ............................................. G01F 23/12
[52] U.S. Cl. ...................................... 340/625; 73/307; 73/317; 137/558
[58] Field of Search ................... 340/59, 625; 73/307, 73/313, 317, DIG. 3, DIG. 5; 137/399, 446, 558

[56] References Cited

U.S. PATENT DOCUMENTS 2,536,805  1/1951  Hansen, Jr. ..................... 73/313 X
3,339,519  9/1967  Taylor et al. ..................... 73/317 X
4,507,961  4/1985  Stradella ............................ 73/317

Primary Examiner—Stewart J. Levy
Assistant Examiner—Joseph W. Roskos
Attorney, Agent, or Firm—W. Thad Adams, III

[57] ABSTRACT

An audible low-fuel alarm (50) for a pressurized propane fuel tank is disclosed. A Hall-effect sensor (57) is mounted in relation to a magnet (35) which is rotated in response to the level of fuel within the propane tank. When magnet (35) is rotated to a position to indicate a low fuel condition, the Hall-effect sensor (57) activates a buzzer 53. A mercury switch (55) prevents false low fuel alarms and conserves battery power during inflation of the balloon envelope.

8 Claims, 8 Drawing Figures

U.S. Patent   Aug. 18, 1987   Sheet 3 of 3   4,688,028
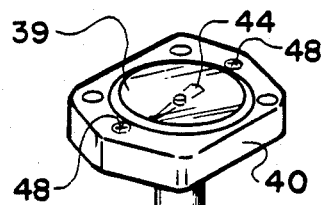
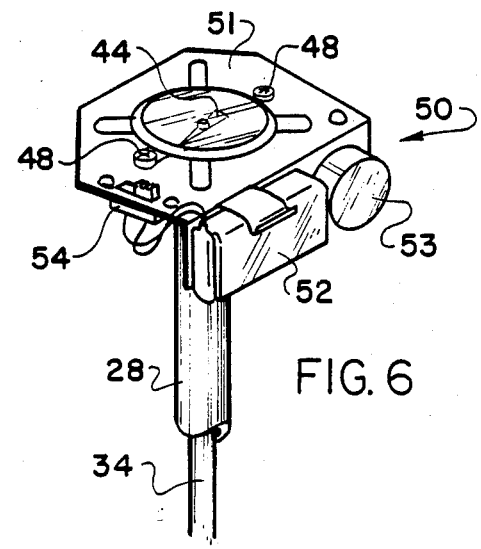
FIG. 6
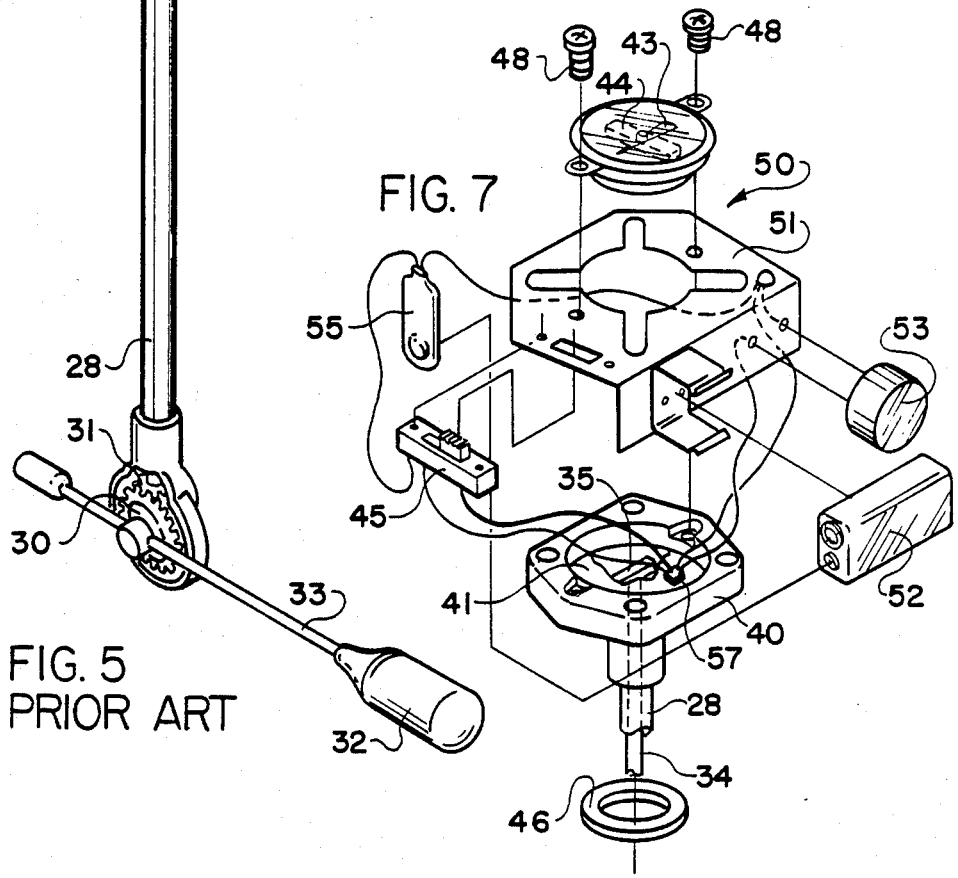
FIG. 5
PRIOR ART
FIG. 7

4,688,028

AUDIBLE LOW-FUEL ALARM FOR PROPANE FUEL TANK

TECHNICAL FIELD AND BACKGROUND OF THE INVENTION

This invention relates to an audible low-fuel alarm for a propane fuel tank such as is used with hot air balloons to project heat into the balloon envelope. The alarm according to the invention described in this application is particularly adapted to be used in connection with a particular type of prior art fuel indicator. The fuel indicator comprises a fuel gauge which is mounted in the top of the propane tank. The fuel gauge includes an indicator needle which is controlled by a rotatably mounted magnet. The fuel gauge itself does not directly communicate with the interior of the propane tank. Rather, a probe is screwed tightly into an access port in the propane tank directly beneath the gauge. A mechanical float senses the amount of propane in the tank and rotates a magnet rotatably mounted on top of the probe in spaced-apart relation to the magnet in the fuel gauge. As the level of propane in the tank drops, the magnet positioned on top of the probe rotates and by magnetic attraction through the wall of the propane tank, rotates the magnet connected to the indicator needle of the gauge.

There are known types of audible alarms which can be used to indicate the existence of low-fuel level or any other fluid in a reservoir. However, these devices typically require insertion within their own port communicating with the interior of the reservoir. This is a particularly undesirable and impractical procedure when dealing with propane tanks. Propane tanks are filled under high pressure, making it essential to have the least possible number of ports in the tank walls, since each port weakens the tank structure and provides a possible location for leakage.

Futhermore, the prior art fuel indicator described above is of necessity located directly on top of the propane tank and very close to the top of the tank because of the requirement that the magnet within the gauge and the magnet on top of the probe be close enough together to be within each other's field of magnetic attraction. This creates a particular problem in hot air balloons, since the fuel tanks are typically stored in the corners of the balloon carriage and tucked under the carriage overhang in order to conserve space for the occupants. For this reason, the gauge cannot easily be seen. The audible alarm therefore serves the purpose of alerting the balloon pilot that the fuel within a particular propane tank has reached a predetermined low level.

Another factor involved in the choice of an audible alarm for a propane fuel tank is the requirement that all such devices be approved by the Federal Aviation Administration. It is therefore particularly desirable to provide an audible alarm which can be used in combination with prior art visual indicators which are already FAA approved, and to have a built-in redundancy in case of malfunction.

SUMMARY OF THE INVENTION

Therefore, it is an object of the invention to provide an audible low-fuel alarm for a propane fuel tank of a hot air balloon.

It is another object of the invention to provide an audible low-fuel alarm which can be used in combination with prior art visual indicators of the type approved by the Federal Aviation Administration.

It is another object of the invention to provide an audible low-fuel alarm which includes means for deactivating the alarm when the carriage of a hot air balloon and the fuel tanks within the carriage are on their respective sides during balloon inflation.

It is another object of the present invention to provide an audible low-fuel alarm which is battery powered.

These and other objects of the present invention are achieved in the preferred embodiment disclosed below by providing an audible low-fluid alarm for a fluid reservoir, comprising a float disposed within the fluid reservoir and movable within a predetermined range of travel responsive to the level of fluid within the reservoir and a driver magnet rotatably mounted within the reservoir for rotational movement responsive to movement of the float to define a magnetic field having a direction corresponding to a particular level of fluid within the reservoir. A sensor is provided exterior to the reservoir for detecting the magnetic field when in the direction corresponding to a particular level of liquid within the reservoir and outputting an electrical signal. A driven magnet is positioned in spaced-apart relation to the driver magnet and exterior to the reservoir, with the sensor being positioned between the driver magnet and the driven magnet in magnetic field sensing relation to both the magnets for providing a redundant sensing capability.

An audible alarm is connected to the sensor for activation by the electrical signal output from the sensor.

Preferably, the driven magnet is operably connected to a visual fluid level indicator and the sensor comprises a Hall-effect sensor.

Preferably, the low fluid alarm includes an attitude sensor for electrically overriding the sensor when the reservoir is in an other than predetermined desired attitude to prevent a false low-fluid alarm.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 5 is a perspective view of a prior art propane tank indicator and float assembly;

FIG. 6 is a fragmentary view of the indicator and float assembly shown in FIG. 5, in combination with the audible low-fuel alarm according to the invention;

FIG. 7 is an exploded view of the indicator and low-fuel alarm shown in FIG. 6.

DESCRIPTION OF THE PREFERRED EMBODIMENT

Figure 1:
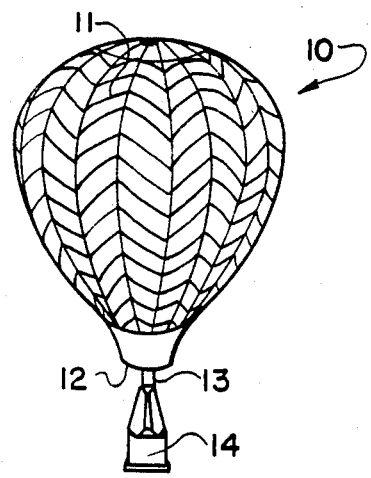
FIG. 1 is a perspective view of a hot air balloon of the type in which the audible low-fuel alarm is used.

Referring now specifically to the drawings, a hot air balloon of the type described in this application is shown and broadly indicated at reference numeral 10. Balloon 10 includes a fabric envelope 11 having a downwardly disposed opening 12 directly beneath which is suspended by load cords 13 a balloon carriage 14. Balloon carriage 14 carries the balloon pilot, passengers, fuel, burners and other equipment necessary for flight.

Figure 2:
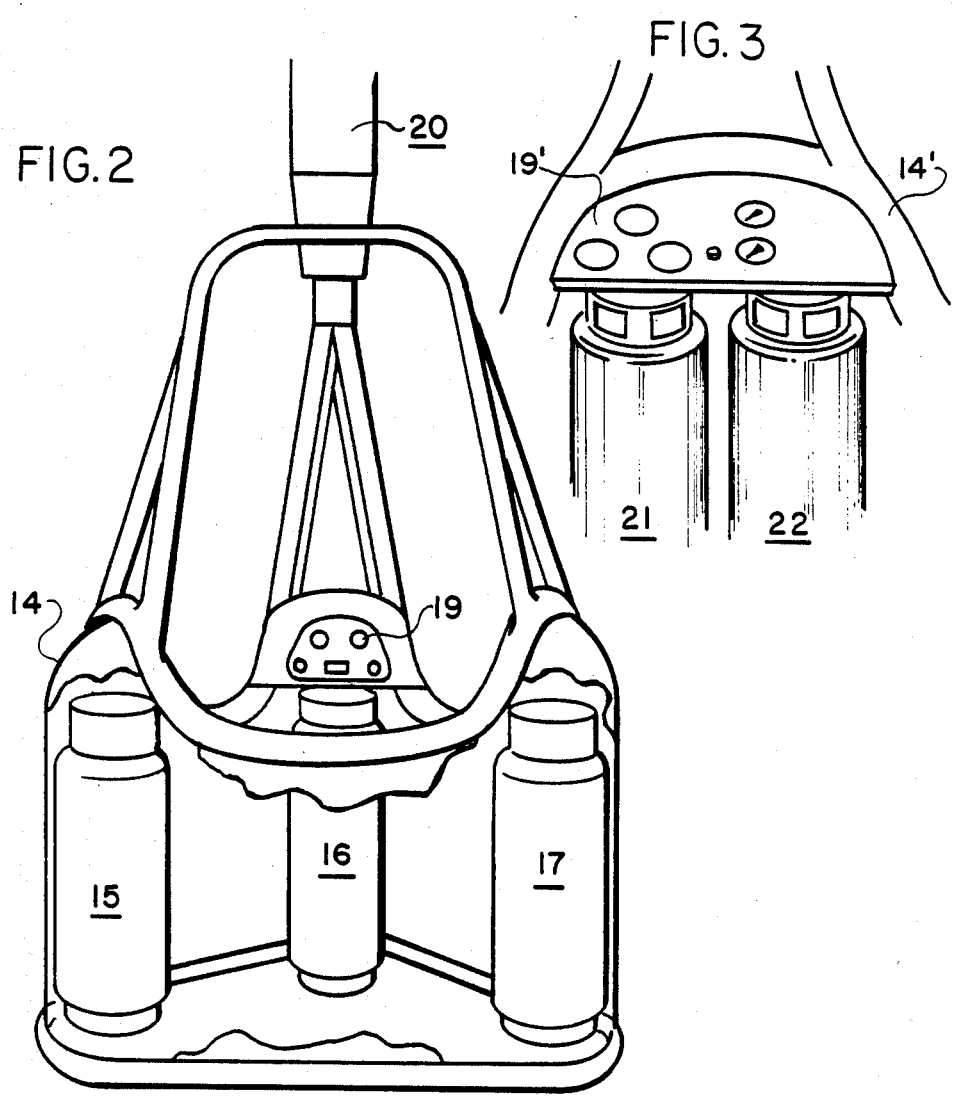
FIG. 2 is a fragmentary, greatly enlarged view, with parts broken away, of the balloon carriage shown in FIG. 1, illustrating the position of the fuel tanks.

Referring now to FIG. 2, balloon carriage 14 according to the particular embodiment described herein is triangular and is constructed in such a manner as to provide corners within which propane tanks 15, 16 and 17 may be positioned. As is also shown in FIG. 2, one or more the corners of balloon carriage 14 may be constructed in such a manner as to hold an instrument panel 19 within which are positioned various required aeronautical instruments. Propane from tanks 15, 16 and 17 is delivered under high pressure to a burner 20 positioned within opening 12, thereby delivering lift-inducing heated air to the interior of balloon envelope 11.

Figure 3:
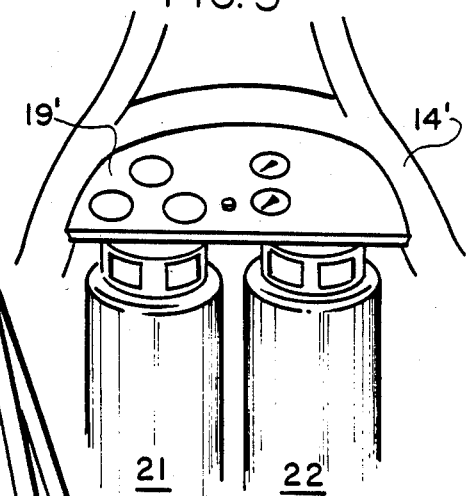
FIG. 3 is a fragmentary view of a balloon carriage illustrating another storage arrangement for the propane fuel tanks.

Referring now to FIG. 3, another typical type of propane tank arrangement is shown, whereby provision is made for two propane tanks 21 and 22 to be positioned within a single corner of a balloon envelope 14'. Again, an instrument panel 19' is positioned in the corner of balloon envelope 14'.

As can be seen in FIGS. 2 and 3, the top of the propane tanks 15-17 and 21 and 22 are difficult to see. This substantially reduces the usefulness of conventional fuel indicators because they are not readily visible by the pilot.

Figure 4:
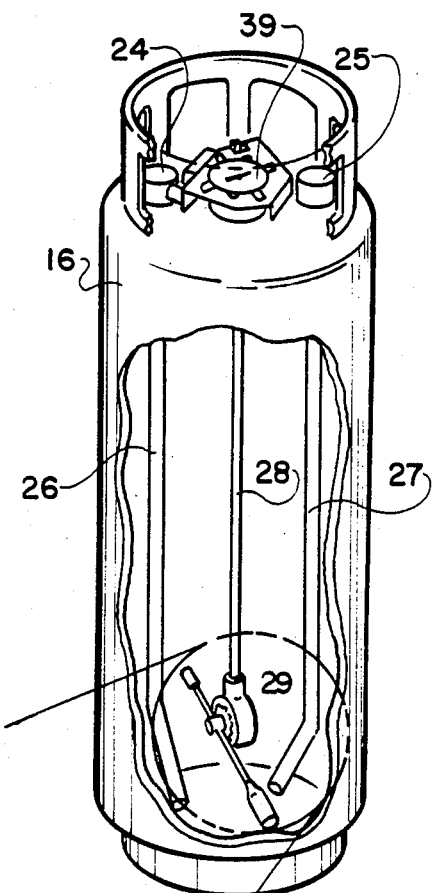
FIG. 4 is a perspective view, with parts broken away and enlarged, of a propane fuel tank of the type used in hot air balloons.
Figure 4:
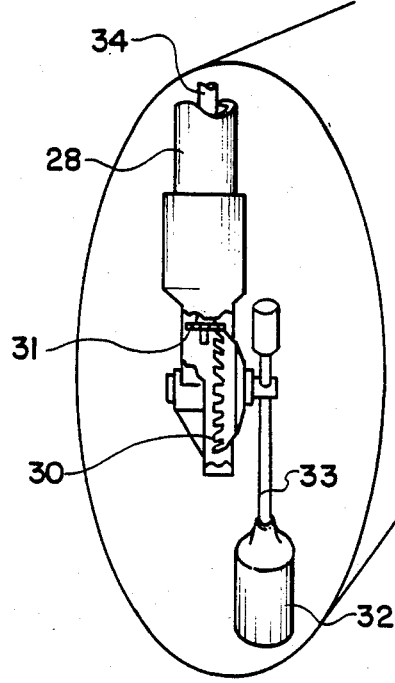

Referring now to FIG. 4, propane tank 16 includes two fuel delivery nozzles 24 and 25 which are connected to two fuel withdrawal tubes 26 and 27, respectively. The amount of propane remaining in the tank is indicated by means of a probe 28 which extends downwardly into the vicinity of the bottom of tank 16. A bevel gear housing 29 is positioned on the end of probe 28. Bevel gears 30 and 31 convert up and down motion of a float 32 positioned on the end of a float extension bar 33 into rotary motion of a shaft 34 positioned within probe 28. A magnet 35, shown in FIG. 7, is positioned for rotation on the top of shaft 34.

By continued reference to FIG. 7, it can be seen that a visual fuel indicator gauge 39 is positioned within a housing 40 into which is also mounted probe 28 with rotatable shaft 34 and magnet 35. Housing 40 includes a solid wall 41 which physically separates magnet 35 from indicator gauge 39. Indicator gauge 39 includes an indicator needle 43 which is mounted for rotation with a rotatably mounted magnet 44.

Indicator gauge 39 is mounted within housing 40 and housing 40 is securely mounted onto propane tank 16 and sealed by a ring seal 46 to prevent leakage from tank 16 to the atmosphere. As is apparent from the foregoing description, magnet 35 acts as a driver magnet which rotates in response to movement of float 32 through shaft 34. A magnetic field is induced through wall 41 of housing 40 and attracts magnet 44 within indicator gauge 39. Magnet 44 is driven by and follows magnet 35, thereby rotating needle 43 and providing a visual indication of the amount of fuel remaining in tank 16. This particular type of indicator is approved by the Federal Aviation Administration and is therefore commonly used in propane tanks of hot air balloons.

In accordance with the present invention, a low fuel alarm 50 is provided to function with indicator gauge 39 described above. Low fuel alarm 50 includes a mount 51 which is mounted on housing 40. To accomplish this, indicator gauge 39 is removed, mount 51 is placed over housing 40 and then indicator gauge 39 is replaced and secured with screws 48. Mounted on mount 51 is a conventional nine-volt battery 52, a buzzer 53, a three-position on-off-test switch 54 and a mercury attitude switch 55. Battery 52, buzzer 53, on-off-test switch 54 and mercury attitude switch 53 are operatively connected to a Hall effect sensor 57 which is stationarily mounted, such as with epoxy cement, on wall 41 of housing 40. Hall effect sensor 57 is mounted in relation to magnet 35 so that when magnet 35 is rotated to a position to indicate a low fuel condition, Hall effect sensor 57 goes "high" activating buzzer 53. Hall effect sensor 57 operates as a current carrying conductor in which is developed a transverse electric potential when placed in a magnetic field, when and only when the conductor is positioned so that the direction of the magnetic field is perpendicular to the direction of current flow. In this way, Hall effect sensor detects and signals the position of magnet 35 when a low fuel condition is indicated.

Mercury switch 55 is useful to prevent false low-fuel alarms and to conserve battery power during inflation of the balloon envelope. Ordinarily, carriage 14 is placed on its side during balloon inflation which, of course, causes the fuel and float 32 within propane tank 16 to be oriented approximately 90° to its normal, operating position. Mercury switch 55 is set so that electrical connection between the battery 52 and buzzer 53 is broken when the balloon carriage is not sitting upright.

Figure 8:
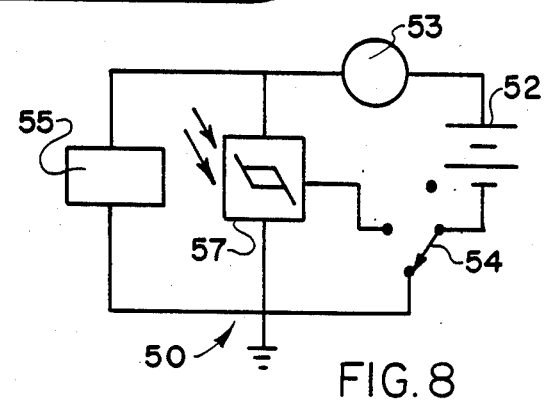
FIG. 8 is an electrical schematic of the low-fuel alarm according to the present invention.

The circuitry of low-fuel alarm 50 is shown schematically in FIG. 8. As is apparent, the particular physical arrangement shown in FIG. 7 is arbitrary and, in fact, the device can be constructed in an integrated circuit form.

A particular advantage offered by the construction described above is a redundant capability which provides for reliable operation of low-fuel alarm 50 even though indicator 39 may be inoperative or absent. For example, since Hall effect sensor 57 is positioned between magnets 35 and 44, a particularly strong magnetic field is developed between the two. This provides a strong, positive actuation of Hall effect sensor 57. If indicator 39 were to be damaged so that free movement of indicator needle 43 and/or magnet 44 was impaired, Hall effect sensor 57 would still be actuated by movement of magnet 35. This is a substantial advantage since redundancy is a desirable characteristic in aviation instrumentation.

Of course, the principles described above are usable for determining low fuel level in fuel tanks other than those used in hot air balloons and, in fact, is usable as well to determine and audibly indicate a low-fluid condition in any type of fluid reservoir.

A low-fuel alarm is described above. Various details of the invention may be changed without departing from its scope. Furthermore, the foregoing description of the preferred embodiment of a low-fuel alarm according to the present invention is provided for the purpose of illustration and not for the purpose of limitation—the invention being defined by the claims.

I claim:

1. An audible low-fluid alarm for a fluid reservoir, comprising:
   (a) float means disposed within the fluid reservoir and movable within a predetermined range of travel responsive to the level of fluid within said reservoir;
   (b) a driver magnet rotatably mounted within said reservoir for rotational movement responsive to movement of said float means to define a magnetic field having a direction corresponding to a particular level of fluid within the reservoir;
   (c) sensor means exterior to said reservoir for detecting the magnetic field when in the direction corresponding to a particular level of liquid within the reservoir and outputting an electrical signal;
   (d) a driven magnet positioned in spaced-apart relation to said driver magnet and exterior to said reservoir, said sensor means being positioned between said driver magnet and said driven magnet in magnetic field sensing relation to both said magnets for providing a redundant sensing capability; and
   (e) audible alarm means connected to said sensor for activation by said electrical signal output from said sensor means.

2. An audible low-fluid alarm according to claim 1, wherein said driven magnet is operably connected to a visual fluid level indicator.

3. An audible low-fluid alarm according to claim 1 or 2, wherein said sensor comprises a Hall-effect sensor.

4. An audible low-fluid alarm according to claims 1 or 2 and including an attitude sensor for electrically overriding said sensor means when said reservoir is in an other than predetermined desired attitude to prevent a false low-fluid alarm.

5. An audible low-fuel alarm for a pressurized propane fuel tank, comprising:
   (a) float means disposed within the fuel tank and movable within a range of travel responsive to the level of propane within said tank;
   (b) a driver magnet rotatably mounted within said tank for rotational movement responsive to movement of said float means to define a magnetic field having a direction corresponding to a particular level of fuel within said tank;
   (c) magnetic field sensing means exterior to said tank for detecting the magnetic field when in the direction corresponding to a particular level of fuel within the tank and outputting an electrical signal;
   (d) a driven magnet connected to a visual fluid level indicator, said driven magnet positioned in spaced apart relation to said driver magnet and said magnetic field sensing means, said magnetic field sensing means being positioned between said driver magnet and said driven magnet in magnetic field sensing relation to both magnets to provide a redundant sensing capability; and
   (e) audible alarm means connected to said magnetic field sensing means for activation by said electrical signal output from said magnetic field sensing means.

6. An audible low-fuel alarm for a pressurized propane fuel tank according to claim 5, wherein said propane fuel tank comprises a fuel tank for a hot air balloon.

7. An audible low-fluid alarm according to claims 5 or 6 and including an attitude sensor for electrically overriding said sensor means when said reservoir is in an other than predetermined desired attitude to prevent a false low-fluid alarm.

8. An audible low-fuel alarm for a pressurized propane fuel system for a hot air balloon, comprising:
   (a) float means disposed within a fuel tank and movable within a range of travel responsive to the level of propane within said tank;
   (b) a driver magnet rotatably mounted within said tank for rotational movement responsive to movement of said float means to define a magnetic field having a direction corresponding to a particular level of fuel within said tank;
   (c) magnetic field sensing means exterior to said tank for detecting the magnetic field when in the direction corresponding to a particular level of fuel within the tank and outputting an electrical signal;
   (d) a driven magnet connected to a visual fluid level indicator, said driven magnet positioned in spaced apart relation to said driver magnet and said magnetic field sensing means, said magnetic field sensing means being positioned between said driver magnet and said driven magnet in magnetic field sensing relation to both magnets to provide a redundant sensing capability; and
   (e) audible alarm means connected to said magnetic field sensing means for activation by said electrical signal output from said magnetic field sensing means.

* * * * *